United States Patent
Kämpf et al.

(10) Patent No.: US 6,196,924 B1
(45) Date of Patent: Mar. 6, 2001

(54) TORQUE LIMITING COUPLING FOR A DRIVELINE

(75) Inventors: Klaus Kämpf; Wolfgang Adamek, both of Lohmar (DE)

(73) Assignee: GKN Walterscheid GmbH, Lohmar (DE)

(*) Notice: Subject to any disclaimer, the term of this patent is extended or adjusted under 35 U.S.C. 154(b) by 0 days.

(21) Appl. No.: 09/166,694

(22) Filed: Oct. 5, 1998

(30) Foreign Application Priority Data

Oct. 7, 1997 (DE) .............................................. 197 44 154

(51) Int. Cl.[7] ...................................................... F16D 7/04
(52) U.S. Cl. ................................................................ 464/37
(58) Field of Search ................................ 192/56.1, 56.5; 464/30, 37, 38, 134

(56) References Cited

U.S. PATENT DOCUMENTS

| | | | |
|---|---|---|---|
| 4,848,547 | * 7/1989 | Kampf | 192/56.5 |
| 4,919,244 | 4/1990 | Bondioli . | |
| 5,342,241 | * 8/1994 | Kampf | 464/37 |
| 5,706,922 | * 1/1998 | Bondioli | 192/56.5 |
| 5,718,634 | * 2/1998 | Mikeska et al. | 464/37 |

FOREIGN PATENT DOCUMENTS

| | | |
|---|---|---|
| 83300/75 | 1/1977 | (AU) . |
| 30 01 566 A1 | 7/1981 | (DE) . |
| 41 37 829 A1 | 5/1993 | (DE) . |
| 44 41 218 C2 | 5/1996 | (DE) . |
| 0 733 820 A1 | 9/1996 | (EP) . |
| 140234 | 3/1920 | (GB) . |

* cited by examiner

*Primary Examiner*—Lynne H. Browne
*Assistant Examiner*—Aaron Dunwoody
(74) *Attorney, Agent, or Firm*—Harness, Dickey & Pierce, P.L.C.

(57) ABSTRACT

A torque limiting coupling for a driveline for driving agricultural implements has a coupling hub (7) with first recesses (14) which receive adjustable driving members (17). The coupling hub (7) further includes second recesses (15) which include a spring assembly (30). Switching cams (27) of the spring assembly (30) load the associated driving member (17). A coupling sleeve (32) is arranged around the coupling hub (7). Covers (37, 38) laterally seal the unit and laterally guide the coupling hub (7). Sealing rings (47, 48) are provided to render the unit oil-proof. Oil at least partially fills the free space between the components. Thus, the unit ensures in the case overloading occurs, the driving members (17), which engage a groove (34) in the torque transmitting position, cannot return into the groove (34) until a relatively low rotational speed has occurred. At high relative rotational speeds, the oil contained in the grooves (34) during rotation prevents the driving members from re-entering the grooves (34).

11 Claims, 5 Drawing Sheets

# TORQUE LIMITING COUPLING FOR A DRIVELINE

CROSS-REFERENCE TO RELATED APPLICATION

This application is based upon and claims priority to German Patent Application 197 44 154.8 filed Oct. 7, 1997, which is herein expressly incorporated by reference.

BACKGROUND OF THE INVENTION

The invention relates to a torque limiting coupling for a driveline for driving agricultural implements. A coupling hub has first recesses which start from the cylindrical outer face and are distributed around the longitudinal axis. The first recesses extend parallel to the longitudinal axis. Furthermore, the coupling hub has second recesses which extend at a right angle relative to the first recesses. The second recesses are open towards the outer face and towards the first recesses. The torque limiting coupling has a coupling sleeve which, with a bore, is coaxially arranged around the coupling hub. Grooves are distributed in the coupling sleeve bore in accordance with the first recesses. The grooves extend parallel to the longitudinal axis and have a supporting face. Driving members, in the form of oblong slides, are adjustable in the first recess relative to the longitudinal axis. On the driving member outsides, on the head faces facing the bore of the coupling sleeve, the driving members each have a torque transmitting face supported on a supporting face of a groove of the coupling sleeve in the torque transmitting position. In the torque transmitting position, the driving members enter the groove. On their radial insides, the driving members have at least one first switching face. In addition, at least one spring-loaded switching cam is associated with each driving member. The switching cam is adjustably positioned in the associated second recess. The switching cam includes at least one second switching face. The switching cam is in contact with the driving member at its end face which faces the first recess and the first switching face. Two covers bridge the radial distance between the coupling hub and the coupling sleeve. The two covers are axially secured to the coupling sleeve. The two covers guide the first portion of the coupling hub, which portion includes the first recesses.

A torque limiting coupling is described in DE 41 37 829 A1. Here, the radially inner ends of the driving members include two switching faces. One face provides support in the transmitting position. In the other position, the face provides support in the disconnected position. Accordingly, the switching cams are provided with two second switching faces. The purpose of the further switching faces is to reduce the forces required to load the driving members towards their torque transmitting position to prevent the driving members from wearing or being damaged when entering the grooves. A further purpose is to reduce the switching speed. The switching speed is the speed at which the driving members start to enter the grooves in the coupling sleeve to be able to be transferred into the torque transmitting position. In DE 41 37 829 A1, a seal is shown, however it only serves to prevent dust from entering during field applications. Otherwise, the components are merely greased.

DE 30 01 566 A1 describes an overload coupling with radially displacable driving members. The driving members, via a torque transmitting face, are held in contact with a corresponding face of a groove-shaped recess in the sleeve-like outer part. The driving members are held by a switching cam acting on the inner ends of the switching faces in order to be able to transmit torque. The switching cam is spring-loaded. The switching faces, at the inner ends of the driving members and the corresponding supporting faces at the switching cams, are designed for the overload position in which the driving members are disengaged from the groove. Thus, the driving members can snap back into the engaged position. The faces which support the driving members in the torque transmitting position and the faces for the friction bearing of the hub, are supplied with lubricating oil. The faces are connected to the lubrication system of an internal combustion engine via a lubricating oil supply channel.

U.S. Pat. No. 4,919,244 describes integrating a disconnection mechanism or an overload coupling into a gearbox running in an oil bath. The overload coupling has radially displacable driving members. The driving members, in their radially outwardly displaced position, are held under the influence of a switching cam acting on their radially inner ends. The switching cam is spring-loaded. In the disconnected position, the mutually contacting faces of the switching cam and of the driving members are designed so that only a slight free force acts outwardly onto the driving members. Further, the faces mutually supporting one another are supplied with lubricant. One of the gears has radially extending bores in its tooth gaps. The bores guide the oil received from the housing to the cooperating faces of the driving members and switching cams.

SUMMARY OF THE INVENTION

It is an object of the invention to reduce the switching speed, especially in the case of couplings with a high transmission performance. Further, the invention ensures that during freewheeling, up to the point when such a speed is reached, the driving members are prevented from entering the grooves in order to reduce wear.

In accordance with the invention, seals are provided to seal the coupling hub, coupling sleeve and covers. Thus, the seals make the unit oil-proof. Oil fills the unit at least partially in the free space between the coupling hub, coupling sleeve and covers. The oil filling degree in the free space and the viscosity of the oil is selectable to achieve the desired re-engagement behavior. The oil filling degree reaches at least twenty (20%) percent of the free space and the viscosity amounts to at least 80 cSt (mm$^2$/s).

Thus, during rotation, oil moves outwardly towards the bore wall of the bore of the coupling sleeve. If, in a case of overloading, the driving members move radially inwardly, so that they fully enter the first recesses of the coupling hub, the grooves in the bore of the coupling sleeve are filled with oil. In the case of a relative rotation between the coupling hub and the coupling sleeve, the driving members can no longer enter the grooves. In practical terms, the driving members slide on the oil in the region of the grooves and remain in their inwardly displaced position. Only when a low speed is reached is the amount of time taken by the driving members to pass over the grooves sufficient to allow the driving members to enter the grooves. In the process, oil is displaced out of the grooves. During the displacement process, the oil has to pass the gaps between the components. This results in a dampened re-engagement speed. When the re-engagement speed is reached, the final position of orientation of the coupling hub and coupling sleeve relative to one another, allowing the driving members to enter the grooves, is reached within a few rotations, so that there is no wear-causing ratchet effect. Overall, it is possible to achieve a long service life. The re-engagement behavior can be changed specifically by the filling degree and by the viscosity of the oil used. It is proposed to fill approximately twenty (20%) percent of the free spaces with oil. However, in a preferred embodiment, the filling degree ranges between fifty (50%) percent and ninety-five (95%) percent. The viscosity of the oil used preferably ranges between 80 cSt (mm²/s) and 460 cSt (mm²/s).

Although the teaching according to the invention can be applied to couplings whose driving members comprise only one switching face at the mutually supporting regions of the driving members and switching cams, preference is given to an assembly where two switching faces at each of the driving members and associated switching cams are provided. Two faces are provided to support the driving members by the spring-loaded switching cams. The other faces are provided to provide support in the disconnected position with a reduced force.

To guide the oil in a specific way, the first recesses are in the form of slots and are open towards the side faces of the first portion of the coupling hub arranged opposite the covers. The two covers, in their faces facing the side faces, each include at least one annular groove.

To achieve a specific design of the gap between the bore and the coupling hub, the coupling sleeve is supported on the coupling hub by two rolling contact bearings arranged on either side of the portion including the flat recesses. The rolling contact bearings are accommodated in bearing bores of the covers.

According to a further embodiment, the coupling hub has a through-bore. The through-bore has a seat portion for a bearing journal. One of the two rolling contact bearings is positioned on the bearing journal. In the case where a coupling hub is attached to a shaft journal by splines, it is advisable to provide the coupling hub with a through-bore into which it is possible to broach the profile for the splines.

In a first variant of such an embodiment, one of the covers is non-removably connected to the coupling sleeve. The other cover is removably accommodated in a bore of the coupling sleeve and sealed relative thereto by a sealing ring. A shaft sealing ring is arranged between the loose cover and the coupling hub. It is possible for one of the covers to be designed to be continuous. Thus, the cover extends over an end face of the coupling hub. In this way, it is possible to design one of the covers as a component of a joint yoke of a universal joint. Accordingly, there is no need to provide an additional seal between the cover and the coupling hub. However, in cases where the coupling hub is provided with a through-bore, it must be ensured that the through-bore can be closed at the end entering the coupling sleeve. However, there also exists a further design possibility where shaft sealing rings are provided between the two covers and the coupling hub. In this way, it is possible for both covers to be removably connected to the coupling sleeve. Also, the sealing rings are provided between the covers and the coupling sleeve. Shaft sealing rings are arranged between both covers and the coupling sleeve.

To allow the coupling to be filled with oil, one of the covers is associated with a filling aperture closable by a plug.

From the following detailed description, taken in conjunction with the drawings and subjoined claims, other objects and advantages of the present invention will become apparent to those skilled in the art.

BRIEF DESCRIPTION OF THE DRAWINGS

Preferred embodiments of the invention are diagrammatically illustrated in the drawings wherein.

DETAILED DESCRIPTION OF THE PREFERRED EMBODIMENT

Figure 4:
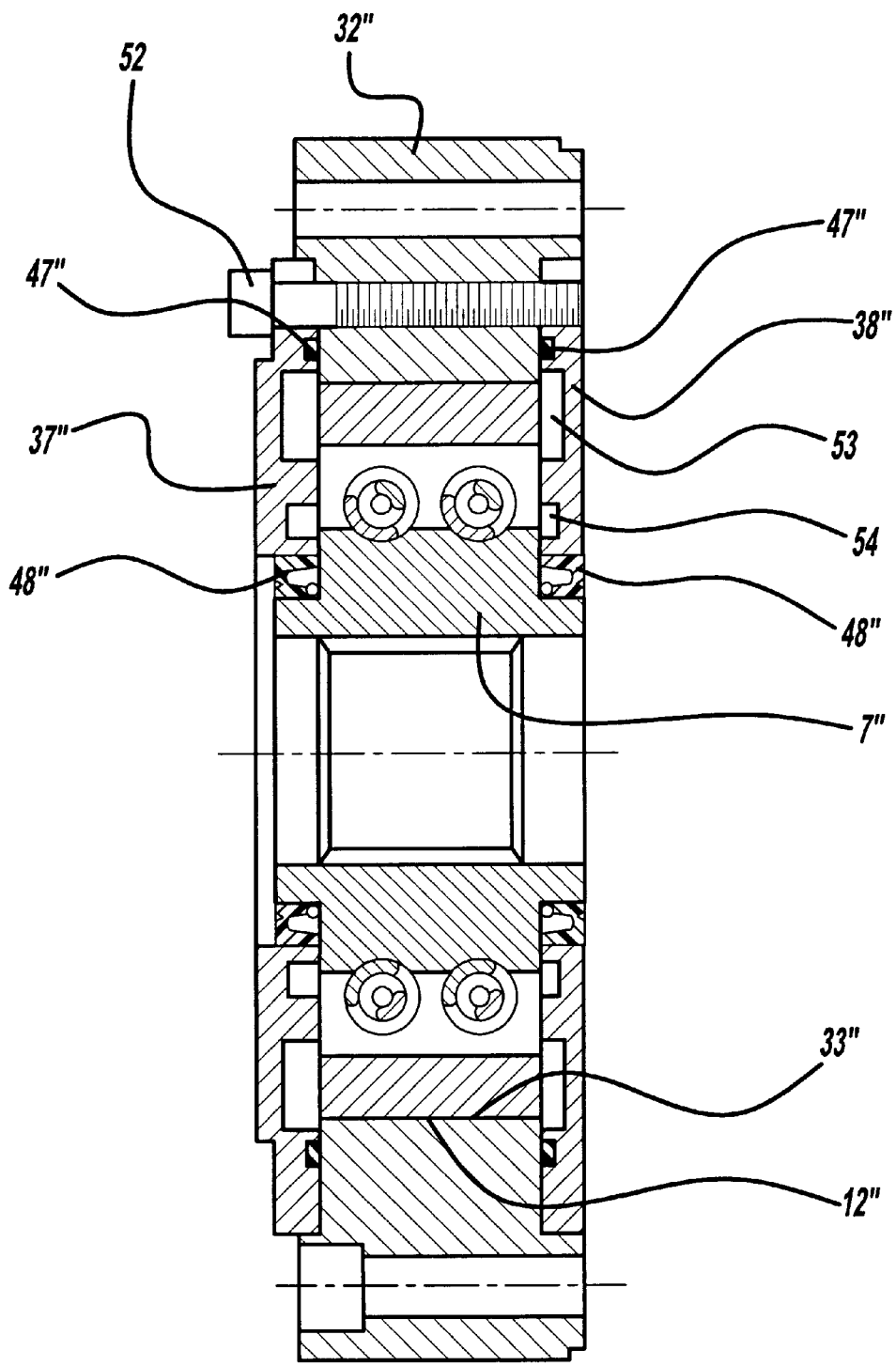
FIG. 4 is a cross-section view of a third embodiment of a torque limiting coupling.
Figure 5:
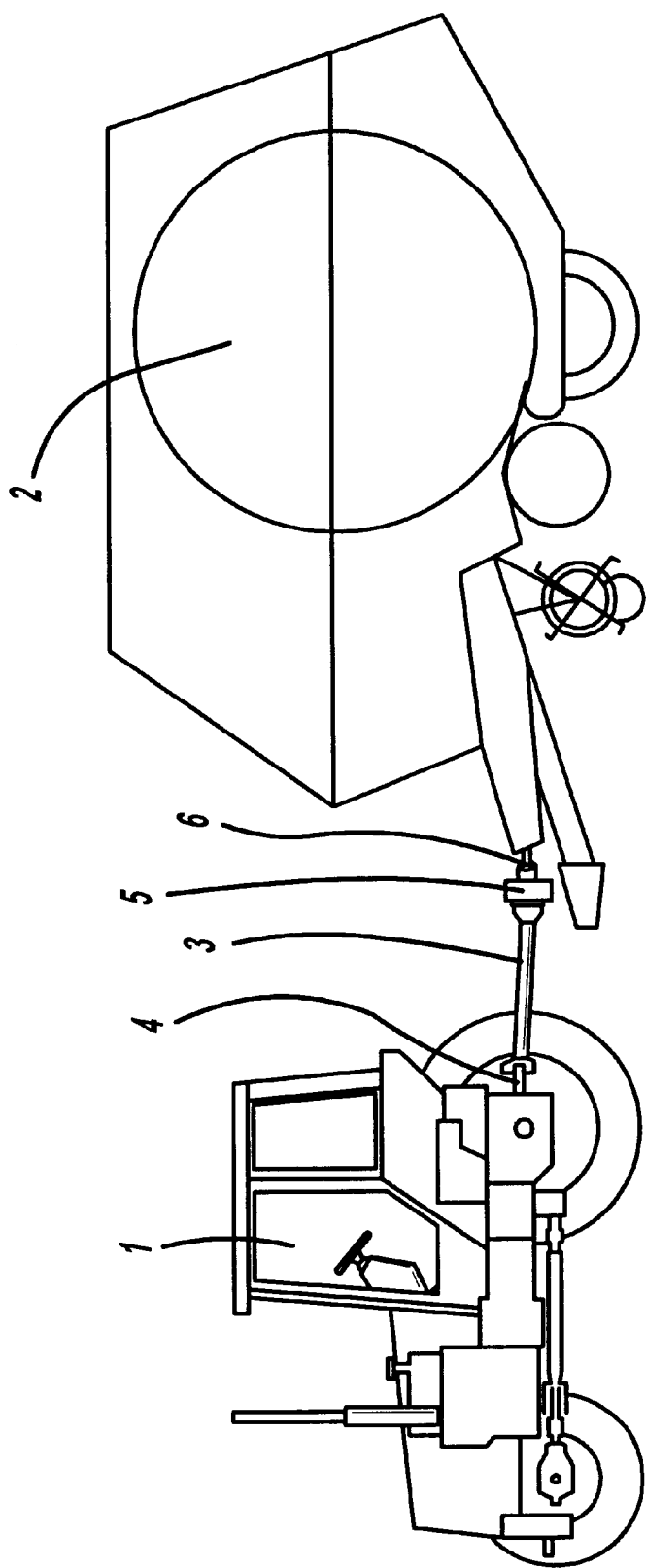
FIG. 5 is a schematic view of a tractor with an attached implement and a driveline for driving the implement by means of the power take-off shaft of the tractor.

FIG. 5 illustrates a tractor 1 with an attached implement 2. The implement 2 may be a large-bale press. The implement 2 is pulled by the tractor 1 and driven by the power take-off shaft 4 of the tractor 1. Thus, a driveshaft 3 is provided which, at one end, is connected to the power take-off shaft 4. The other end of the driveshaft 3 is connected to the driving journal 6 of the implement 2. The driveshaft 3 is associated with a torque limiting coupling 5. The coupling is to prevent any damage in the case of overloading, for example, if the implement 2 is clogged up. The torque flow between the power take-off shaft 4 and the driving journal 6 and vice versa is interrupted by the coupling. Various embodiments of the torque limiting coupling 5 will be described in greater detail with reference to FIGS. 1 to 4.

Figure 1:
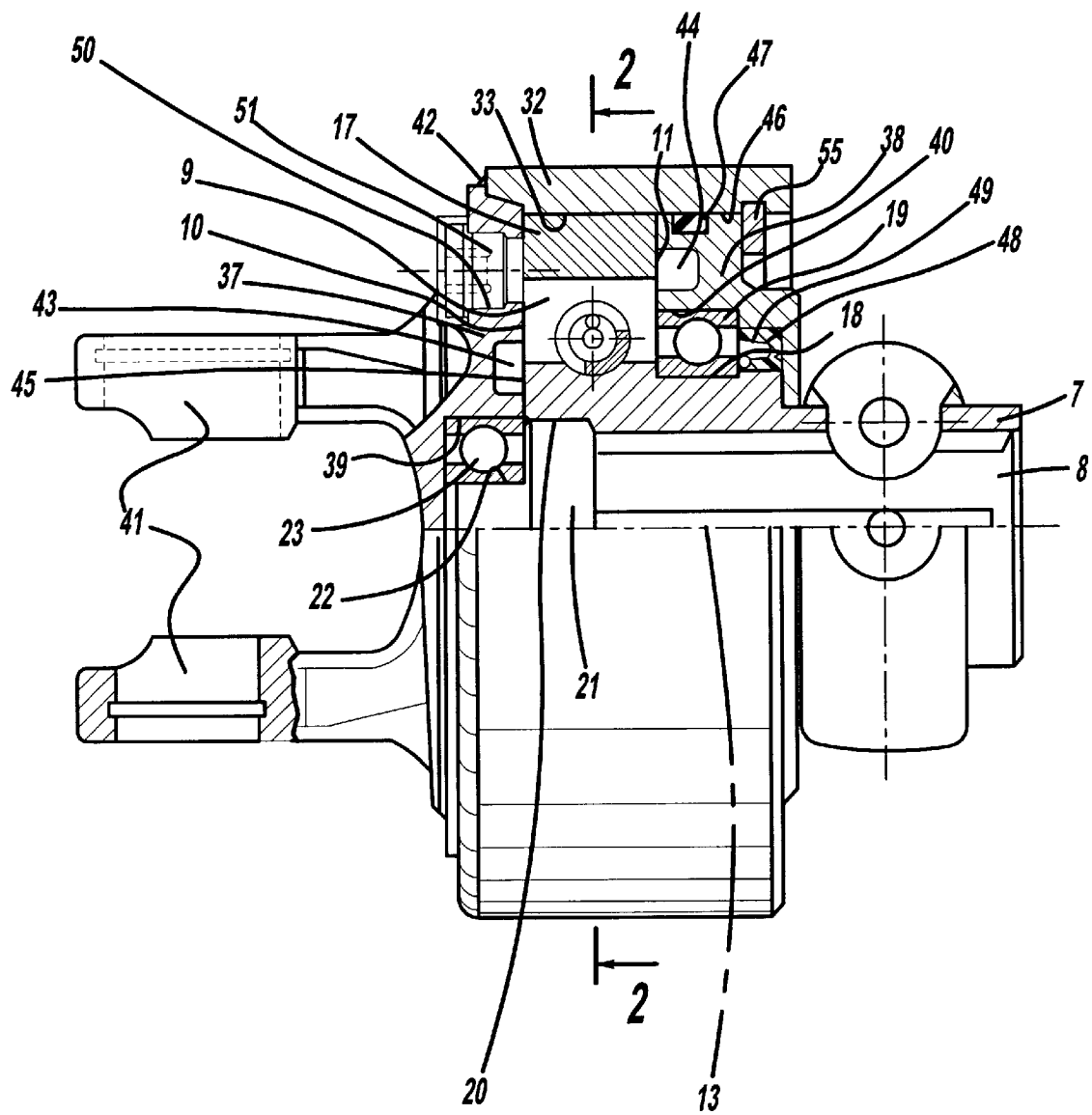
FIG. 1 is a partial cross-section view of a first embodiment of a torque limiting coupling.
Figure 2:
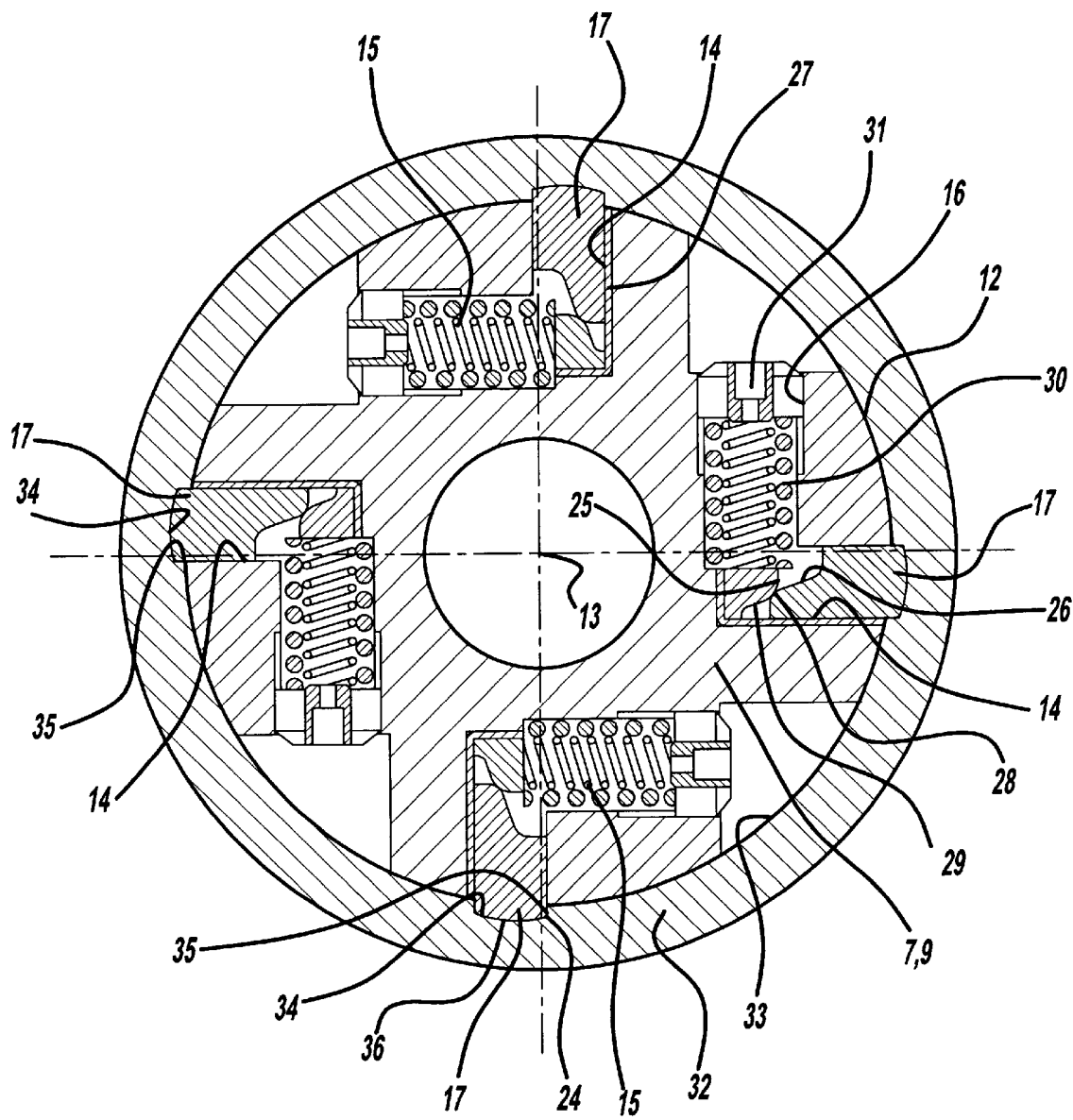
FIG. 2 is a section view along line II—II according to FIG. 1.

FIGS. 1 and 2 illustrate a first embodiment of a torque limiting coupling. The coupling includes a coupling hub 7 with a central bore 8 centered on a longitudinal axis 13. The central bore 8 is designed as a through-bore, with one portion of the bore 8 having splines in order to establish a torque connection with a driving journal. Also, the bore 8 has a hollow cylindrical seat portion 20 with an enlarged diameter.

The coupling hub 7 has a first portion 9 whose diameter is increased relative to the bearing seat 18. The first portion 9 has a cylindrical outer face 12 which is laterally delimited by the two side faces 10 and 11.

First recesses 14 are provided in the first portion 9. The first recesses are slot-shaped and start from the outer face 12. The first recesses central axis extends parallel to a face containing the longitudinal axis 13. In the present embodiment, each first recess 14 is associated with a second recess 15. The first recess 14 is associated with a driving member 17.

The driving member 17 is in the form of a slide. The driving member 17 is adjustable from a position in which it projects beyond the outer face 12 into a withdrawn position in which it is positioned inside the contour of the outer face 12.

A cylindrical bearing seat 18, arranged next to the first position 9, serves to receive the inner race of a rolling contact bearing 19. The seat portion 20 of the coupling hub is associated with a stepped journal 21. The journal 21 has a cylindrical bearing face 22 whose diameter is reduced relative to the seat portion 20. A rolling contact bearing 23 is positioned on the journal 21 by its inner race.

The driving members 17, at their ends adjustable beyond the outer face 12 of the coupling hub 7, each have a torque transmitting face 24. The face 24 extends at an angle. At its inner end positioned in the first recess 14, the driving members 17 include two first switching faces 25, 26. The first switching face 25 is loaded by a second switching face 28 of a switching cam 27. The first switching face 25 supports the driving member 17 in the torque transmitting position. The further first switching face 26 of the driving member 17 and the further second switching face 29 of the switching cam 27 are in contact with one another when the driving member 17 is in the disconnected position, where it is withdrawn into the first recess 14.

The switching faces 25, 26 and 28, 29, respectively, extend in such a way that a spring assembly 30, loading the switching cams 27 and positioned in the second recess 15, either applies a sufficiently high supporting force for the driving members 17 in the torque transmitting position or loads the driving members with a reduced force. The spring assembly 30 arranged in the second recess 15 is supported against a screw 31 threaded into an inner threaded portion 16 of the second recess 15. Thus, it is also possible to adjust the force of the switching cams 27 acting on the driving members 17.

The coupling sleeve 32 is supported on the rolling contact bearings 19, 23. The coupling sleeve bore 33 is arranged around the coupling hub 7. Four grooves 34 are provided on the bore to receive the heads of the driving members 17. The heads 36 project beyond the outer face 12 in the torque transmitting position. Supporting faces 35 extend in the grooves 34 to support the torque transmitting faces 24 of the driving members 17. The driving members 17, by their head faces 36, enter the grooves 34 far enough to almost completely fill the grooves 34.

The coupling sleeve 32 has a cover 37 which fully covers the end face 45 of the coupling sleeve 7. The coupling sleeve 32 has a bearing bore 39 which supports the outer race of the rolling contact bearing 23. The cover 37 is connected by a weld 42 to the coupling sleeve 32. The cover carries the yoke arms 41 of a universal joint. An annular groove 43 is arranged close to the rolling contact bearing 23 in the cover 37. The cover 37, by means of its inner face, is positioned opposite the side face 10 of the coupling hub 7.

The coupling sleeve 32 has a further cover 38 which is received and centered in a bore 46 arranged in front of the bore 33. An annular groove is provided in the outer face of the cover 38. The annular groove accommodates a sealing ring 47 and effects an oil-proof connection relative to the coupling sleeve 32. The cover 38 is held by a securing ring 55 secured at the coupling sleeve 32.

Thus, in the direction of the longitudinal axis 13, the coupling 7, by its first portion 9 and its two side faces 10, 11, is guided between the covers 37, 38. The cover 38 has a bearing bore 40 to receive the outer race of the rolling contact bearing 19. The cover 38 has a receiving bore 49 for a shaft sealing ring 48. The sealing ring 48 has a sealing effect relative to the bearing seat 18 of the coupling hub 7. The cover 38 also includes an annular groove 44 in its inner face pointing towards the side face 11. However, the annular groove 44 is arranged on a greater diameter than the annular groove 43 of the cover 37. The cover 37, additionally, has a filling aperture 50 which is closed by threaded plug 51. The filling bore 50 is used to introduce oil into the inner space delimited by the coupling hub 7, the coupling sleeve 32 and the covers 37, 38.

When, as illustrated, the torque limiting coupling rotates around the longitudinal axis 13 in the torque transmitting position, the driving members 17, as illustrated, engage the grooves 34. If the load occurring is such that the driving members 17 move inwardly out of the grooves 34, the first switching face 26 and the second switching face 29 come into contact with one another. At the same time, if rotation continues, the oil contained in the remaining spaces, for example in the annular grooves 43, 44 and the first recesses 14, is able to reach the grooves 34 and fill the grooves.

During the relative rotation occurring between the coupling sleeve 32 and the coupling hub 7, the driving members 17, via their heads, slide over part of their range of movement at the wall of the bore 33 and on the oil of the grooves 34. While the rotational speed continues to be high, the driving members 17 cannot enter the grooves 34 and displace the oil because the respective force is reduced due to the support provided by the switching faces 26 and 29. Only when the rotational speed is reduced, can the oil be displaced out of the grooves 34 by the driving members 17. Then, the driving members can move into the torque transmitting position.

As a result of the gaps existing between the driving members 17 and the first recesses 14 and at the ends between the side faces 10, 11 and the covers 37, 38, it is possible to achieve an additional damping effect when the driving members 17 enter the grooves. This is caused by the oil escaping inwardly through the gaps in order to reach the annular grooves 43, 44 and the free spaces of the first recesses 14 underneath the driving members 17 and the second recesses. If necessary, additional channels for guiding the oil in a specific direction may be provided.

The behavior of the torque limiting coupling can be influenced by selecting oil viscosity and by determining the amount of oil present in the torque limiting coupling.

Figure 3:
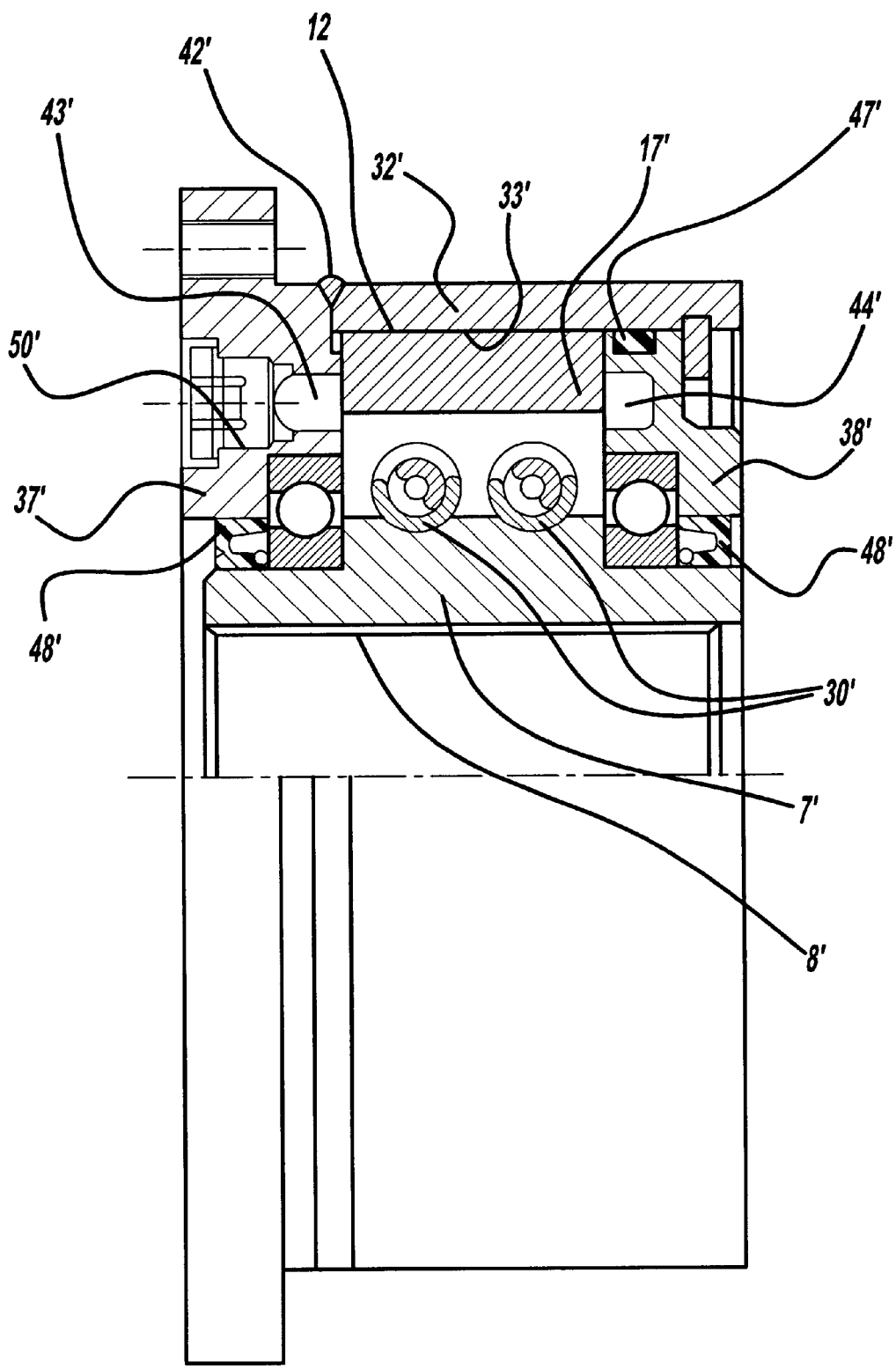
FIG. 3 is a partial cross-section view of a further embodiment of a torque limiting coupling.

FIG. 3 shows a second embodiment of a torque limiting coupling. The coupling hub 7' has a toothed through-bore 8'. The hub 7' has a central portion in which the driving members 17' are guided. Furthermore, the coupling hub 7', at each of its ends, has a seat face which receives two rolling contact bearings. One cover 37' is firmly connected to the coupling sleeve 32'. The other cover 38' is positioned in the bore 33' of the coupling sleeve 32' and is held by a securing ring. The first cover 37' is connected to the coupling sleeve 32' by a weld 42'. Both covers 37', 38', on their inner faces, have annular grooves 43', 44' which are arranged on the same diameter. The fixed cover 37' has a filling bore 50' which ends in the region of the annular groove 43' and is closed by a plug. The loose cover, in its outer circumferential face, has an annular groove which is engaged by a sealing ring 47' which serves to seal the unit to make it oil-proof. Further, shaft sealing rings 48' are accommodated in both covers 37', 38' on one side of the rolling contact bearings. The shaft sealing rings have a sealing function relative to the coupling hub 7'. Each driving member 17' is loaded by two spring assemblies 30'.

FIG. 4, finally, shows a third embodiment where the coupling sleeve 32" is associated with two covers 37", 38". The covers 37", 38" accommodate and guide the first portion of the coupling hub 7". The outer face 12", while cooperating with the bore 33" of the coupling sleeve 32", serves to support the coupling hub 7". On their inner faces, the two covers 37", 38" each have two coaxially arranged annular grooves 53, 54 and two further annular grooves which serve to receive sealing rings 47". The two covers are pressed against the side faces of the coupling sleeve 32" via the sealing rings 47". Circumferentially distributed screws 52 are provided to tension the covers 37", 38" against the coupling sleeve 32". Shaft sealing rings 48" are arranged between the two covers 37" and 38" and the coupling hub 7". The shaft sealing rings 48" render the unit oil-proof. Oil is also provided in the unit.

While the above detailed description describes the preferred embodiment of the present invention, the invention is susceptible to modification, variation and alteration without deviating from the scope and fair meaning of the subjoined claims.

What is claimed is:

1. A torque limiting coupling for a driveline for driving agricultural implements, comprising:
   a coupling hub having first recesses starting from a cylindrical outer face, said recesses being distributed around and extending parallel to a longitudinal axis, and second recesses in said coupling hub extending at right angles relative to said first recesses, said second recesses being open towards said outer face and extending towards the first recesses;
   a coupling sleeve having a bore arranged coaxially around said coupling hub, said bore having grooves with a supporting face, said grooves being distributed to correspond to the first recesses and extend parallel to the longitudinal axis;
   driving members, in the form of oblong slides, being adjustably positioned in said first recess, torque transmitting faces are on said driving members, said torque transmitting faces being supported on the supporting face of said grooves in a torque transmitting position, said driving members on their radial inside include at least one first switching face;
   at least one spring-loaded switching cam per driving member being displacably arranged in an associated second recess, said switching cam including at least one second switching face positioned towards the first recess and towards the driving member, at least one first switching faces, said at least one second switching face being in contact with said driving member;
   two covers bridging a space between said coupling hub and said coupling sleeve, said covers being axially secured at the coupling sleeve, said covers accommodating a first portion of the coupling hub, said first portion having the first recesses;
   seals for sealing the coupling hub, the coupling sleeve and the covers so as to provide oil proofing; and
   oil at least partially filling the free space between the coupling hub, the coupling sleeve and the covers, oil level in the free space and the viscosity of the oil being selectable to achieve the desired reconnection behavior and with the oil level reaching at least twenty (20%) percent of the free space and the viscosity at least 80 cSt ($mm^2/s$) and during disengagement of said driving member said oil preventing re-engagement with said groove until re-engagement speed is achieved.

2. A torque limiting coupling according to claim 1, wherein said first recesses being slots open towards side faces of the first portion of the coupling hub, said side faces being arranged opposite the covers, and said two covers in their faces facing the side faces having at least one annular groove each.

3. A torque limiting coupling according to claim 1, wherein the coupling sleeve is supported on the coupling hub by two rolling contact bearings arranged on one side of the portion having the first recesses, said rolling contact bearings being accommodated in bearing bores of the covers.

4. A torque limiting coupling according to claim 3, wherein the coupling hub has a through-bore with a seat portion for a bearing journal which includes one of the two rolling contact bearings.

5. A torque limiting coupling according to claim 1, wherein one cover is non-removably connected to the coupling sleeve and the other cover is removably accommodated in a bore of the coupling sleeve and sealed relative thereto by a sealing ring and a shaft sealing ring is positioned between the loose cover and the coupling hub.

6. A torque limiting coupling according to claim 5, wherein one cover is designed to be continuous and extends over an end face of the coupling hub.

7. A torque limiting coupling according to claim 5, wherein a shaft sealing ring is positioned between the cover firmly attached to the coupling sleeve and the coupling hub.

8. A torque limiting coupling according to claim 1, wherein both covers are removably connected to the coupling sleeve and are sealed relative to said coupling sleeve by sealing rings and being sealed relative to the coupling hub by shaft sealing rings.

9. A torque limiting coupling according to claim 1, wherein one cover is provided with a closable filling aperture.

10. A torque limiting coupling according to claim 1, wherein the oil level reaches between fifty (50%) percent and ninety-five (95%) percent of the free space.

11. A torque limiting coupling according to claim 1, wherein the viscosity of the oil ranges between 80 cSt ($mm^2/s$) and 460 cSt ($mm^2/s$).

* * * * *